United States Patent
Chen et al.

(10) Patent No.: US 12,387,318 B2
(45) Date of Patent: *Aug. 12, 2025

(54) HOT SPOT DEFECT DETECTING METHOD AND HOT SPOT DEFECT DETECTING SYSTEM

(71) Applicant: Taiwan Semiconductor Manufacturing Company, Ltd., Hsinchu (TW)

(72) Inventors: Chien-Huei Chen, Kaohsiung (TW); Pei-Chao Su, Hsinchu County (TW); Xiaomeng Chen, Hsinchu County (TW); Chan-Ming Chang, Hsinchu (TW); Shih-Yung Chen, Hsinchu (TW); Hung-Yi Chung, Taoyuan (TW); Kuang-Shing Chen, Hsinchu (TW); Li-Jou Lee, Hsinchu (TW); Yung-Cheng Lin, Hsinchu (TW); Wei-Chen Wu, Hsinchu (TW); Shih-Chang Wang, Hsinchu (TW); Chien-An Lin, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,211

(22) Filed: Jan. 8, 2024

(65) Prior Publication Data

US 2024/0144467 A1      May 2, 2024

Related U.S. Application Data

(63) Continuation of application No. 17/121,760, filed on Dec. 15, 2020, now Pat. No. 11,900,586, which is a
(Continued)

(51) Int. Cl.
*G06T 7/00* (2017.01)
*G01N 21/88* (2006.01)
(Continued)

(52) U.S. Cl.
CPC ......... *G06T 7/001* (2013.01); *G01N 21/8851* (2013.01); *G01N 21/9505* (2013.01);
(Continued)

(58) Field of Classification Search
CPC ............... G06T 7/001; G06T 7/0006; G06T 2207/20081; G06T 2207/20084;
(Continued)

(56) References Cited

U.S. PATENT DOCUMENTS

| | | | |
|---|---|---|---|
| 2017/0140524 A1* | 5/2017 | Karsenti | G06T 7/0004 |
| 2017/0206650 A1* | 7/2017 | Kulkarni | G06T 7/001 |
| 2019/0080447 A1* | 3/2019 | Shkalim | G06T 7/0006 |

* cited by examiner

*Primary Examiner* — Ping Y Hsieh
(74) *Attorney, Agent, or Firm* — JCIPRNET

(57) ABSTRACT

A hot spot defect detecting method and a hot spot defect detecting system are provided. In the method, hot spots are extracted from a design of a semiconductor product to define a hot spot map comprising hot spot groups, wherein local patterns in a same context of the design yielding a same image content are defined as a same hot spot group. During runtime, defect images obtained by an inspection tool performing hot scans on a wafer manufactured with the design are acquired and the hot spot map is aligned to each defect image to locate the hot spot groups. The hot spot defects in each defect image are detected by dynamically mapping the hot spot groups located in each defect image to a plurality of threshold regions and respectively performing automatic thresholding on pixel values of the hot spots of each hot spot group in the corresponding threshold region.

20 Claims, 7 Drawing Sheets

Related U.S. Application Data continuation of application No. 16/116,899, filed on Aug. 29, 2018, now Pat. No. 10,872,406.

(60) Provisional application No. 62/656,997, filed on Apr. 13, 2018.

(51) Int. Cl.
*G01N 21/95* (2006.01)
*G06N 3/04* (2023.01)
*G06N 3/08* (2023.01)

(52) U.S. Cl.
CPC ................. *G06N 3/04* (2013.01); *G06N 3/08* (2013.01); *G06T 7/0006* (2013.01); *G01N 2021/8854* (2013.01); *G01N 2021/8887* (2013.01); *G06T 2207/20081* (2013.01); *G06T 2207/20084* (2013.01); *G06T 2207/30141* (2013.01); *G06T 2207/30148* (2013.01); *G06T 2207/30168* (2013.01)

(58) Field of Classification Search
CPC . G06T 2207/30141; G06T 2207/30148; G06T 2207/30168; G06T 7/0004; G06T 2207/10004; G01N 21/8851; G01N 21/9505; G01N 2021/8854; G01N 2021/8887; G01N 2021/8861; G01N 2021/8877; G06N 3/04; G06N 3/08
See application file for complete search history.

HOT SPOT DEFECT DETECTING METHOD AND HOT SPOT DEFECT DETECTING SYSTEM

CROSS REFERENCE TO RELATED APPLICATION

This application is a continuation application of and claims the priority benefit of a prior application Ser. No. 17/121,760, filed on Dec. 15, 2020, now allowed. The prior application Ser. No. 17/121,760 is a continuation application of U.S. application Ser. No. 16/116,899, filed on Aug. 29, 2018, now patented, which claims the priority benefit of U.S. provisional application Ser. No. 62/656,997, filed on Apr. 13, 2018. The entirety of each of the above-mentioned patent applications is hereby incorporated by reference herein and made a part of this specification.

BACKGROUND OF THE INVENTION

In the manufacturing processes of modern semiconductor devices, various materials and machines are manipulated to create a final product. Manufacturers have dedicated to reduce particulate contamination during processing so as to improve product yield. Due to the increasing complexity of semiconductor devices and the development of ultra-small transistors, the need for defect detection and control is further emphasized.

The inspection on the semi-manufactured product is frequently performed during manufacturing by using optical inspection tool in order to timely find the defects. The sensitivity of existing optical inspection tool is limited by wafer noise. Since defect size continues to decrease along with advancement of process, the defect signals are becoming even weaker than the wafer noise. As a result, those optical inspection tools begin to show more and more gaps in detecting various types of defects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
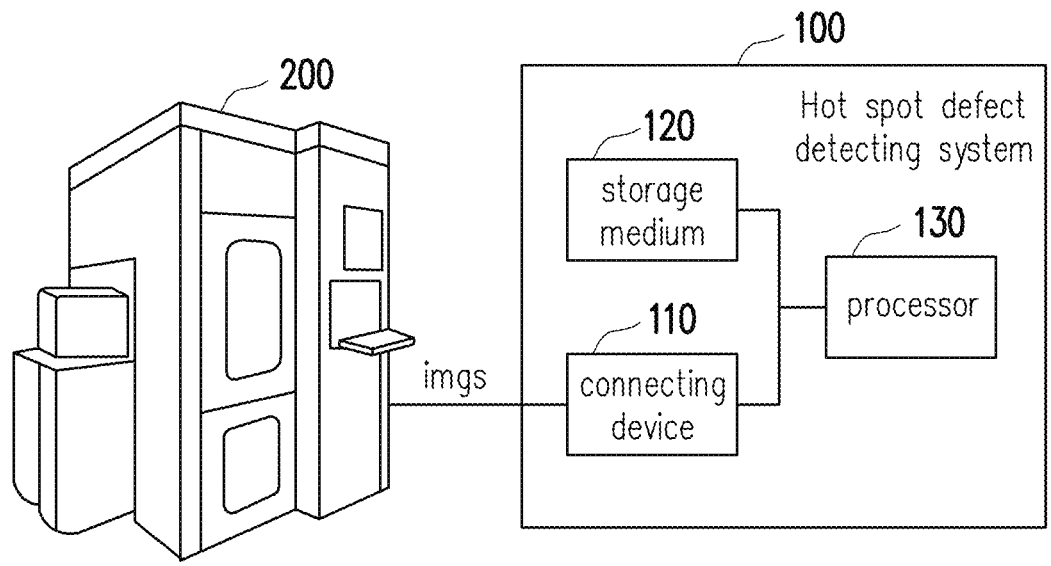
FIG. 1 illustrates a schematic block diagram of a hot spot defect detecting system according to an embodiment of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Defects of interest (DOIs) are defects specific to an integrated circuit layout of a semiconductor product that may occur at a specific area and form a local pattern during the manufacturing process of the semiconductor product. In the present disclosure, the DOIs are detected and identified in advance by using an optical inspection tool, and according to a design of a semiconductor product, local patterns of the integrated circuit where defects of interest (DOIs) may actually occur are extracted as hot spots and grouped into multiple hot spot groups, in which the local patterns in a same design context that yield a same image content are defined as a same group while different local patterns or a same local pattern in different design contexts that may result in different image contents are split into separated groups. As for the hundreds or thousands of hot spot groups defined through aforesaid method, a dynamic mapping mechanism is adopted to map the hot spot groups in each of the defect images acquired from the inspection tool to a limited number of threshold regions during runtime, and thus the method may not only maximize the tool's sensitivity in detecting defects but also enable the inspection tool to handle virtually unlimited number of hot spot groups.

FIG. 1 illustrates a schematic block diagram of a hot spot defect detecting system according to an embodiment of the disclosure. Referring to FIG. 1, a hot spot defect detecting system 100 of the embodiment includes a connecting device 110, a storage medium 120, and a processor 130 coupled to the connecting device 110 and the storage medium 120.

In some embodiments, the hot spot defect detecting system 100 is externally connected to at least one inspection tool (an optical inspection tool 200 is taken as an example in the embodiment) and configured to acquire defect images imgs from the optical inspection tool 200 by the connecting device 110, where the optical inspection tool 200 is configured to perform hot scans on at least one wafer. The hot spot defect detecting system 100 is configured to analyse the acquired defect images imgs to detect hot spot defects.

In some embodiments, the hot spot defect detecting system 100 may be disposed or embedded in the optical inspection tool 200, which is not limited herein. The hot spot defect detecting system 100 will be described in detail in the following descriptions.

The connecting device 110 is configured to connect to the optical inspection tool 200 to acquire defect images imgs from a plurality of inspection images obtained by the optical inspection tool 200. The connecting device 110 is, for example, any wired or wireless interface compatible to the optical inspection tool 200 such as USB, firewire, thunderbolt, universal asynchronous receiver/transmitter (UART), serial peripheral interface bus (SPI), WiFi, or Bluetooth, which is not limited herein.

The storage medium 120 is configured to store the defect images acquired by the connecting device 110. The defect images from the optical inspection tool 200 takes a considerable amount of memory storage, hence the storage medium 120 is, for example, a mass storage device, a redundant array of independent disks (RAID), other similar storage device or a combination thereof having a high storage capacity, but the disclosure is not limited thereto.

The processor 130 is configured to execute instructions for carrying out the hot spot defect detecting method of the embodiments of the disclosure. The processor 130 is, for example, a central processing unit (CPU), other programmable general-purpose or specific-purpose microprocessors, a digital signal processor (DSP), a programmable controller, an application specific integrated circuit (ASIC), a programmable logic device (PLD), other similar devices, or a combination thereof, but the disclosure is not limited thereto.

Figure 2:
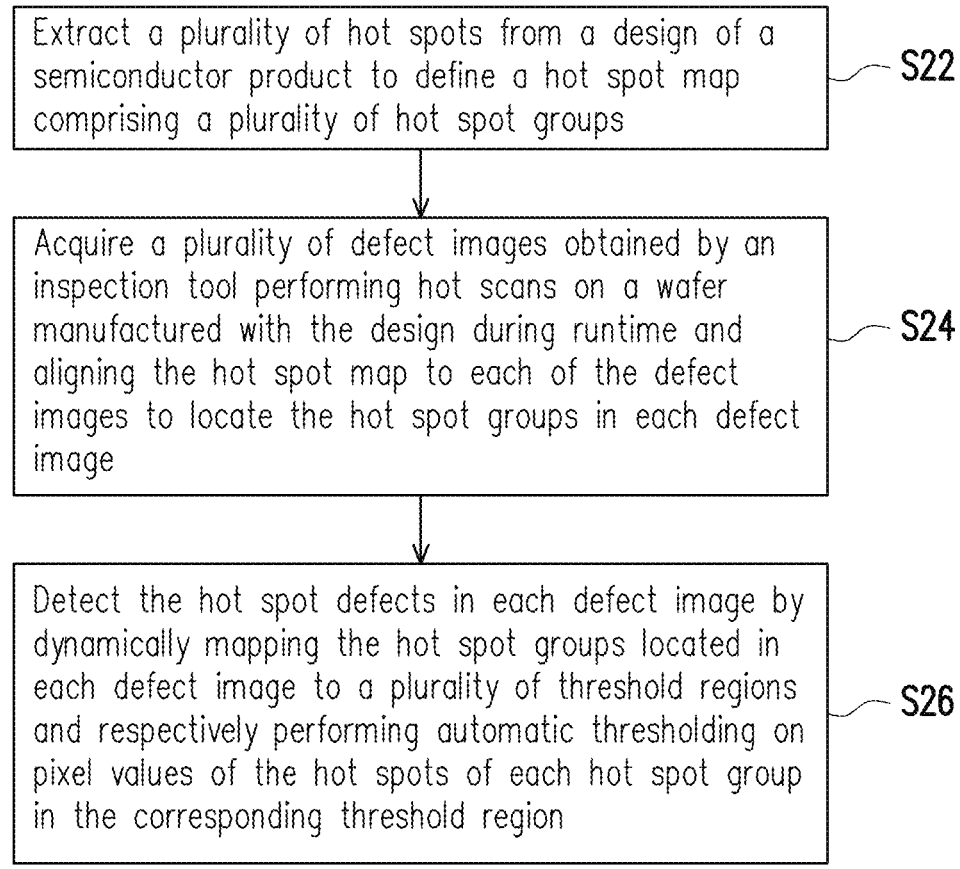
FIG. 2 is a flowchart illustrating a method for detecting hot spot defects according to an embodiment of the disclosure.
Figure 3A:
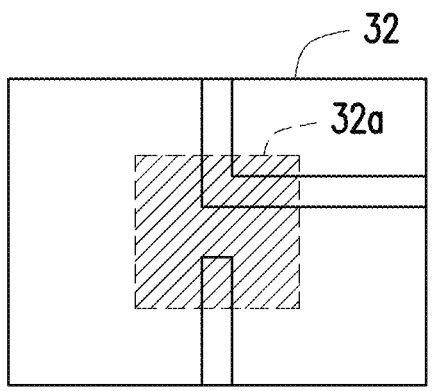
FIG. 3A to FIG. 3D are examples of extracting and grouping hot spots according to one embodiment of the disclosure.
Figure 3B:
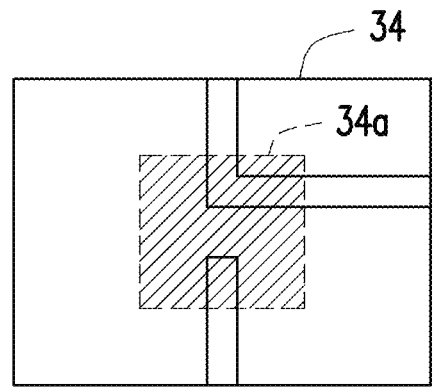
Figure 3C:
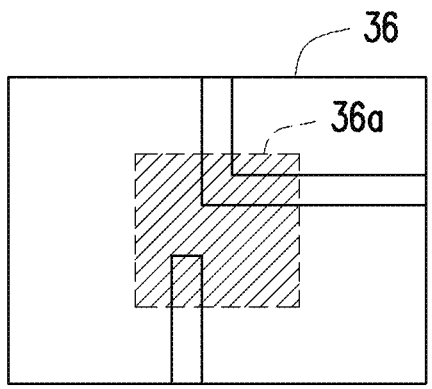
Figure 3D:
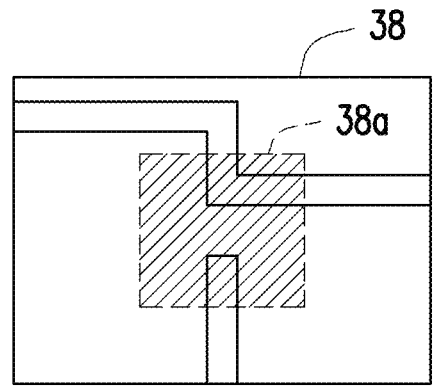

The hot spot defect detecting system 100 is adapted for carrying out a hot spot defect detecting method in accordance with some embodiments of the present disclosure. In detail, FIG. 2 is a flowchart illustrating a method for detecting hot spot defects according to an embodiment of the disclosure. Referring to FIG. 1 and FIG. 2, the method of the present embodiment is adapted to the hot spot defect detecting system 100 of FIG. 1, and detailed steps of the method of the present embodiment are described below with reference to various components in the hot spot defect detecting system 100 of FIG. 1.

In step S22, the processor 130 of the defect detecting system 100 extracts a plurality of hot spots from a design of a semiconductor product to define a hot spot map comprising a plurality of hot spot groups, in which a plurality of local patterns in a same context of the design yielding a same image content are defined as a same hot spot group. The hot spot map is, for example, stored in the storage medium 120 for further use.

In some embodiments, various layout patterns of integrated circuits where defects may occur are previously identified and defined as the local patterns where the defects may occur by using the optical inspection tool 200. Accordingly, the design of the semiconductor product is analysed such that the local patterns of integrated circuits of the design matching with the previously defined layout patterns are extracted as the hot spots.

In some embodiments, for a given type of hot spot defect, there could be multiple design contexts that can produce this hot spot defect. The local pattern where the defect can actually occur could be quite different among those design contexts. Different local patterns will result in different image content (i.e. gray level and noise level at the hot spot pixels) during runtime. Mixture of different image contents will result in higher variation of noise level, making the defects buried deeper in the noise cloud and therefore harder to be detected or sampled. Based on the above, only local patterns in the design that yield the same image content are considered as belonging to the same group. If there are multiple design contexts that can produce a same type of hot spot defects (i.e. with a same image content), they are split into separated groups according to the local pattern. In some embodiments, for each group, the location of each hot spot shall be centered on a location where the corresponding defect is most likely to occur and the size of the hot spot shall be equal to or less than one inspection pixel size.

For example, FIG. 3A to FIG. 3D are examples of extracting and grouping hot spots according to one embodiment of the disclosure. Referring the FIG. 3A and FIG. 3B, images 32 and 34 have a same design context and respectively include hot spot images 32a and 34a that have a same local pattern and therefore the local pattern as shown in the hot spot images 32a and 34a is extracted as one hot spot group. Referring the FIG. 3A and FIG. 3C, the image 36 includes a hot spot image 36a that has a local pattern different from the local pattern of the hot spot image 32a in the image 32 and therefore the hot spot image 36a and the hot spot image 32a are spitted into separated groups. Referring the FIG. 3A and FIG. 3D, the image 38 includes a hot spot image 38a that has a local pattern the same as the local pattern of the hot spot image 32a in the image 32 but has a different image context in an area other than the hot spot image 38a (e.g. the upper conductive line in the hot spot image 38 is extended leftward while the upper conductive line in the hot spot image 32 is extended upward).

Based on the above, the hot spots are grouped so that the noise level of each group is minimal during inspection and the sensitivity in detecting the hot spot defects is maximized.

Back to the flow in FIG. 2, during runtime (i.e. the period that the hot spot defect detecting system 100 performs the defect detection on the wafer desired to be inspected), in step S24, the processor 130 acquires a plurality of defect images obtained by the inspection tool performing hot scans on a wafer manufactured with the design and aligns the hot spot map to each of the defect images so as to locate the hot spot groups in each defect image.

In some embodiments, the hot spot map including locations of hot spot groups in the defect images is retrieved from the storage medium 120 by the processor 130 and used to align with each of the defect images such that the hot spot groups in each defect image can be located.

In step S26, the processor 130 detects the hot spot defects in each defect image by dynamically mapping the hot spot groups located in each defect image to a plurality of threshold regions and respectively performing automatic thresholding on pixel values of the hot spots of each hot spot group in the corresponding threshold region. In some embodiments, the threshold region refers to computing resource including computing power and storage provided by the defect detecting system 100 for performing automatic thresholding on one hot spot group, and a number of threshold regions that can be supported by the defect detecting system 100 depends on a computing capability of the processor 130 and a storage capacity of the storage medium 120.

Figure 4:
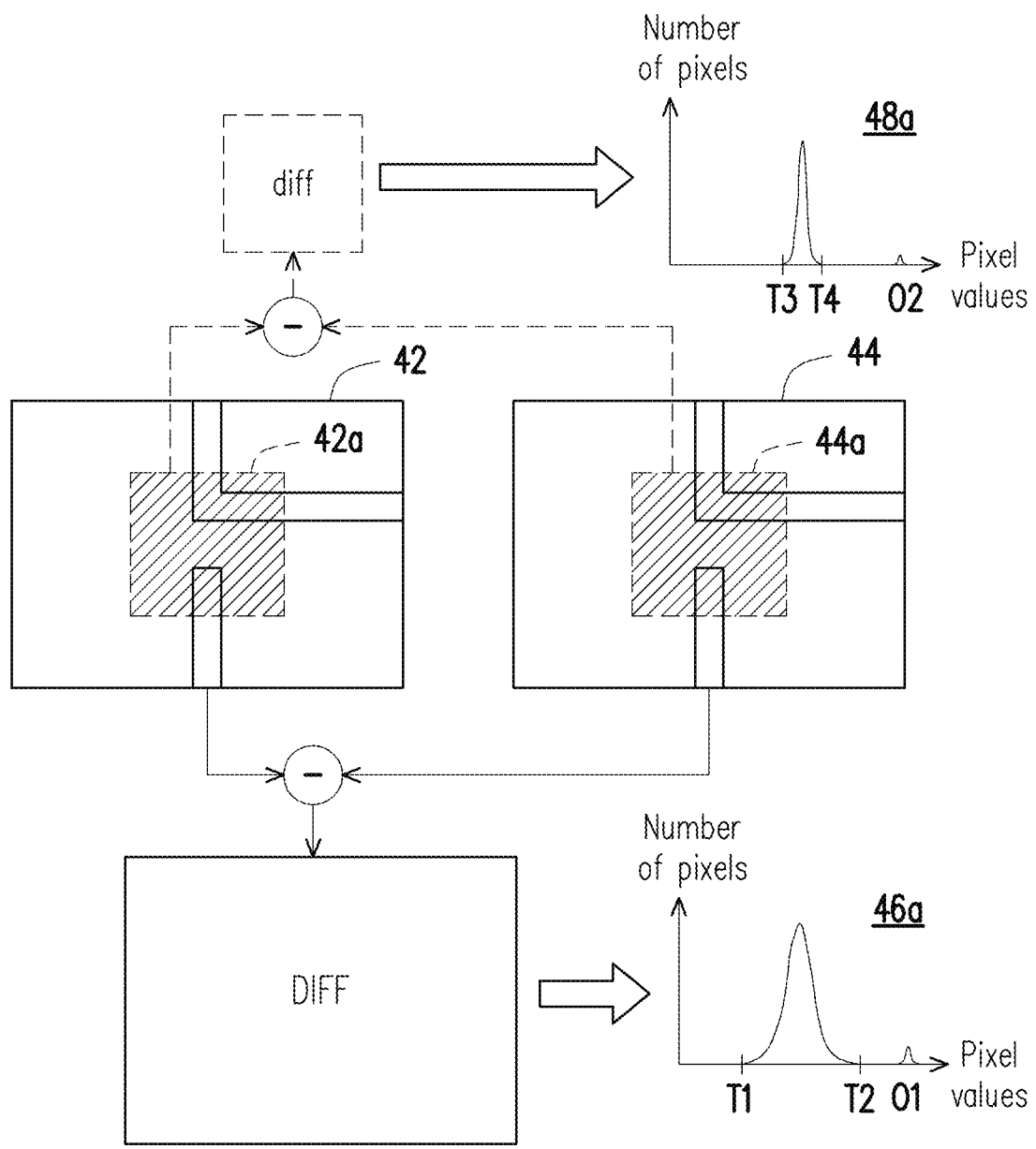
FIG. 4 is a schematic diagram illustrating a method for detecting hot spot defects according to an embodiment of the disclosure.

FIG. 4 is a schematic diagram illustrating a method for detecting hot spot defects according to an embodiment of the disclosure. In some embodiments, a set of test image 42 and a reference image 44 are compared to detect the defects on the corresponding area of a wafer to be inspected (not shown). The reference image 44 is, for example, an image obtained by the inspection tool performing hot scans on a previous die in the wafer, in which the previous die is the die that the optical inspection tool captures the image (i.e. the reference image 44) before capturing the image (i.e. the test image 42) of the die to be inspected. The comparison of the test image 42 and the reference image 44 for detecting the hot spot defects could be implemented in various ways such as statistical test. One exemplary embodiment is described below but it should not be considered limiting the embodiment.

In some embodiments, a difference image DIFF of the test image 42 and the reference image 44 which have been pre-processed through, for example, histogram equalization is calculated, in which the pixel value of each pixel in the difference image DIFF is a pixel value difference between the corresponding pixels of the test image 42 and the reference image 44. Most of the pixel values of the pixels in the difference image DIFF should be around zero except for the pixels corresponding to the defects. In some embodiments, a histogram 46a of pixel values of the difference image DIIFF is calculated where the vertical axis of the histogram 46a represents the number of pixels, and the horizontal axis of the histogram 46a represents the pixel values. By evaluating at least one threshold T1 and T2 for differentiating the data points in the histogram 46a by using a statistical method (e.g. by using the lower and upper quartiles of the ordered data points), an outlier O1 that deviates from other data points is determined, and the pixels having the pixel values corresponding to the outlier O1 of the histogram 46a can be determined as the defect. The aforementioned method is usually adopted by the inspection tool for detecting the defects on the test image 42.

In some embodiments, the hot spot image 42a in the test image 42 and the hot spot image 44a in the reference image 44 are respectively located by aligning the hot spot map to the test image 42 and the reference image 44. A difference image diff of the hot spot image 42a and the hot spot image 44a is calculated, in which the pixel value of each pixel in the difference image diff is a pixel value difference between the corresponding pixels of the hot spot image 42a and the hot spot image 44a. Most of the pixel values of the pixels in the difference image diff should be around zero except for the pixels corresponding to the defects. In some embodiments, a histogram 48a of pixel values of the difference image diff is further calculated where the vertical axis of the histogram 48a represents the number of pixels, and the horizontal axis of the histogram 48a represents the pixel values. By evaluating at least one threshold T3 and T4 for differentiating the data points in the histogram 48a by using a statistical method (e.g. by using the lower and upper quartiles of the ordered data points), an outlier O2 that deviates from other data points is determined, and the pixels having the pixel values corresponding to the outlier O2 of the histogram 48a can be determined as the hot spot defect. Compared to the detecting method using the images 42 and 44, the calculation in the present method is specific to the hot spot images 42a and 44a, so as to detect the hot spot defect on the test image 42.

In some embodiments, due to practical limitation of computing power, the inspection tool (analogy to the hot spot defect detecting system 100 of the embodiment) is designed with a limited number of threshold regions, which is, for example, 32 or 256. However, the grouping method as illustrated in step S22 of the present embodiment may potentially result in hundreds or thousands of hot spot groups which are beyond the capability of the inspection tool. Accordingly, in some embodiments, a dynamic mapping mechanism that maps the hot spot groups to the limited number of threshold regions during runtime is provided.

Figure 5:
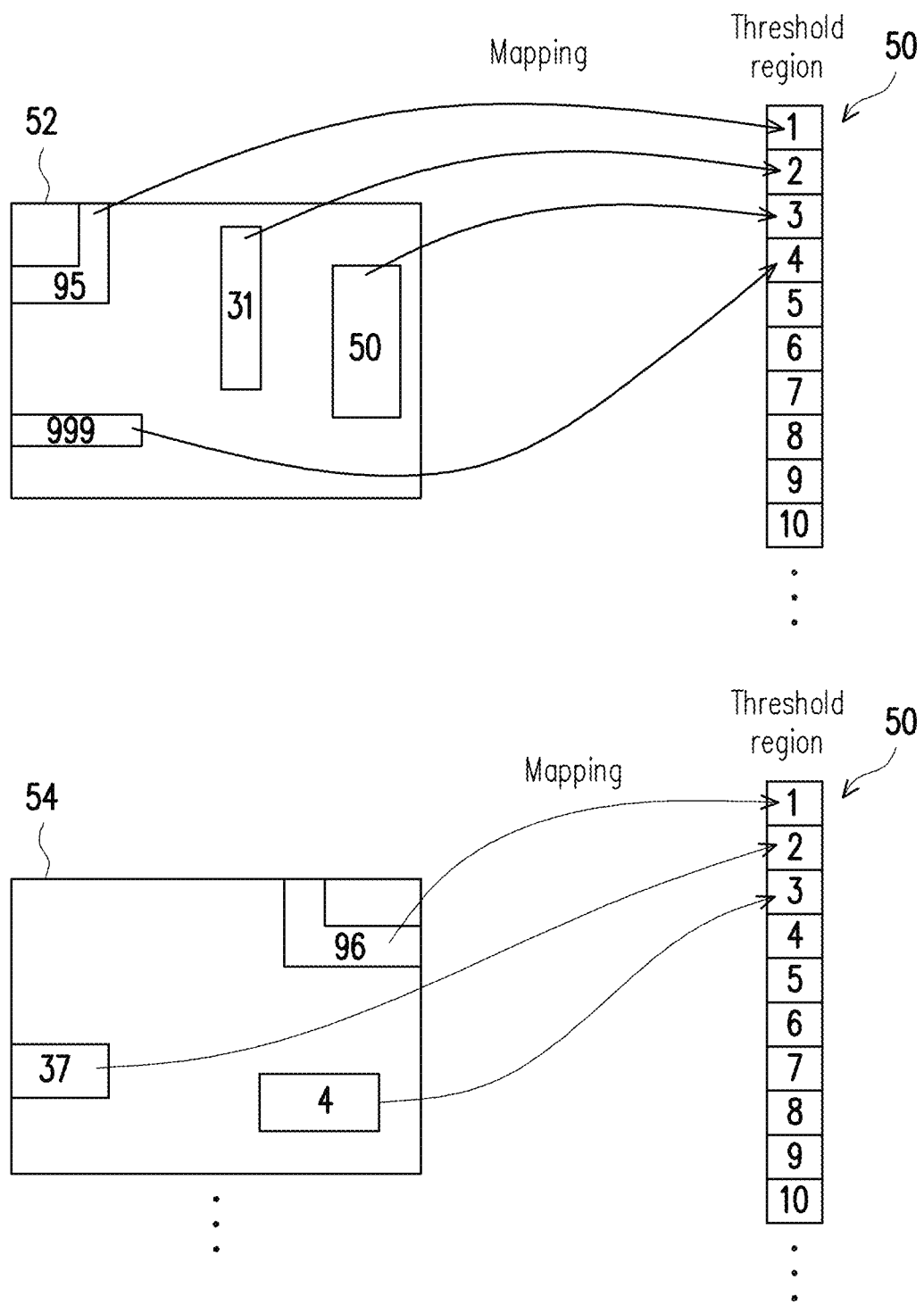
FIG. 5 is a schematic diagram illustrating a dynamic mapping mechanism according to an embodiment of the disclosure.

FIG. 5 is a schematic diagram illustrating a dynamic mapping mechanism according to an embodiment of the disclosure. In some embodiments, although hundreds or thousands of hot spot groups are defined, those hot spot groups usually do not simultaneously occur in one defect image. Instead, the number of hot spot groups that actually occur in each defect image is limited, and therefore the hot spot groups in each defect image may be dynamically mapped to the threshold regions 50 for subsequent automatic thresholding.

For example, in the defect image 52, hot spot images respectively corresponding to hot spot groups numbered 95, 31, 50 and 999 are located by aligning the hot spot map to the defect image 52 and the hot spot groups 95, 31, 50 and 999 are dynamically mapped to the threshold regions 1 to 4. In each of the threshold regions 1 to 4, at least a detection threshold for the threshold region is determined based on noise levels of the pixels of the hot spots of each hot spot group, and the pixels having the pixel values deviating from the detection threshold are determined as the hot spot defect.

Similarly, in the defect image 54, hot spot images respectively corresponding to hot spot groups numbered 96, 37 and 4 are located by aligning the hot spot map to the defect image 54 and the hot spot groups 96, 37 and 4 are dynamically mapped to the threshold regions 1 to 3. In each of the threshold regions 1 to 3, at least a detection threshold for the threshold region is determined based on noise levels of the pixels of the hot spots of each hot spot group, and the pixels having the pixel values deviating from the detection threshold are determined as the hot spot defect.

The defect images subsequently acquired are sequentially mapped to the threshold regions 50 for automatic thresholding until all the defect images are processed. For the threshold regions where the hot spot defects are detected, a region number of the threshold region is mapped back to the hot spot group so as to confirm the types of hot spot groups occurring in the defect images.

Based on the above, through the dynamic mapping mechanism that maps the hot spot groups to the limited number of threshold regions during runtime, the method of the present embodiment may enable the inspection tool to handle virtually unlimited number of hot spot groups.

In some embodiments, in addition to the method for extracting and grouping the hot spots and dynamic mapping the hot spot groups, a machine learning technique is further adopted to find the best operation mode of the inspection tool and the optimal image filters for detecting the hot spot defect.

Figure 6:
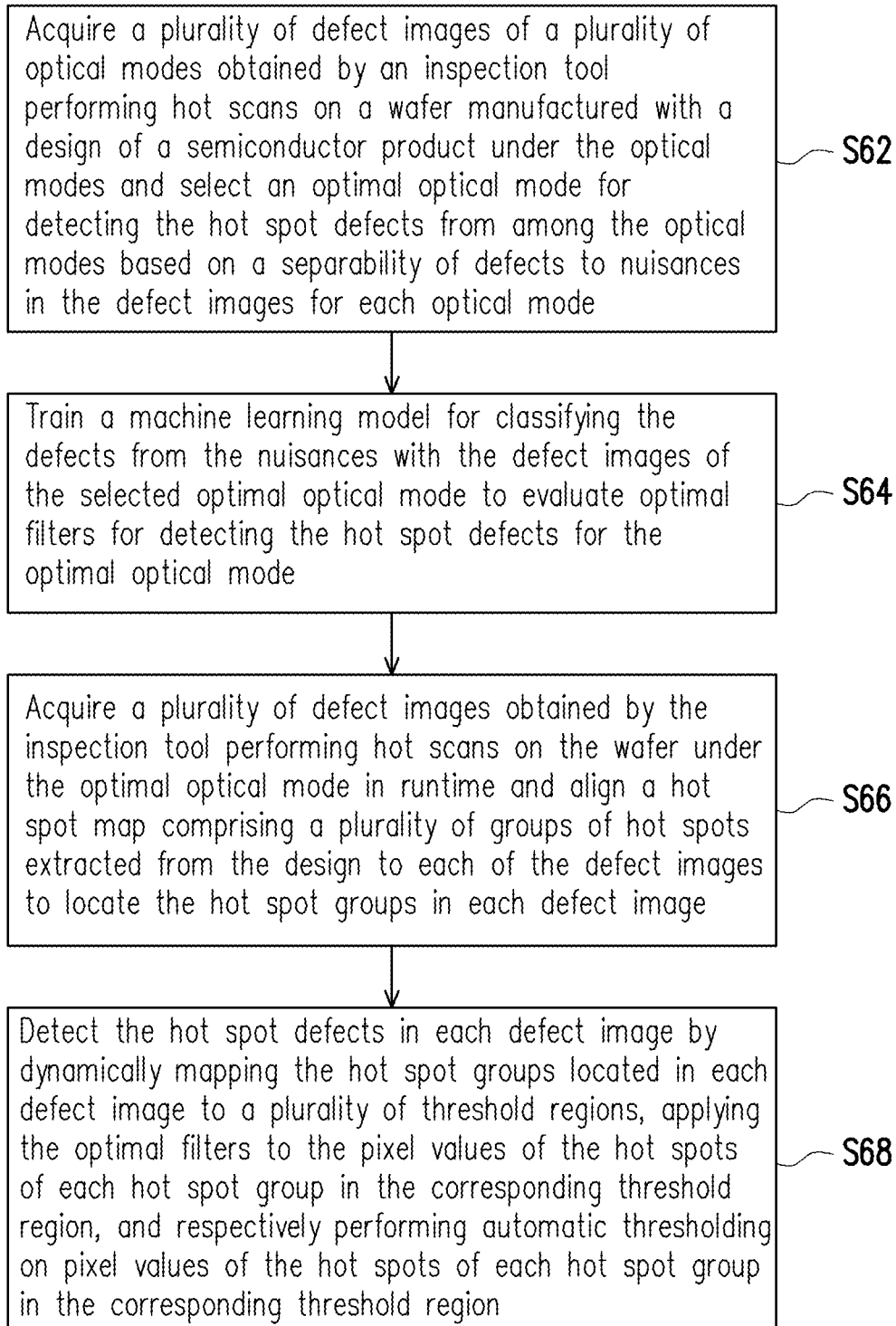
FIG. 6 is a flowchart illustrating a method for detecting hot spot defects according to an embodiment of the disclosure.

In detail, FIG. 6 is a flowchart illustrating a method for detecting hot spot defects according to an embodiment of the disclosure. Referring to FIG. 1 and FIG. 6, the method of the present embodiment is adapted to the hot spot defect detecting system 100 of FIG. 1, and detailed steps of the method of the present embodiment are described below with reference of various components of the hot spot defect detecting system 100 of FIG. 1.

In step S62, the processor 130 of the defect detecting system 100 acquires a plurality of defect images of a plurality of optical modes obtained by an inspection tool performing hot scans on a wafer manufactured with a design of a semiconductor product under various optical modes and selects an optimal optical mode for detecting the hot spot defects from among the optical modes based on a separability of defects to nuisances in the defect images for each optical mode.

In some embodiments, in various optical modes, different parameters such as intensity and wavelength of the incident light, lens aperture, or exposure time are applied for operating the optical inspection tool so as to find the best mode for detecting the hot spot defects.

Figure 7:
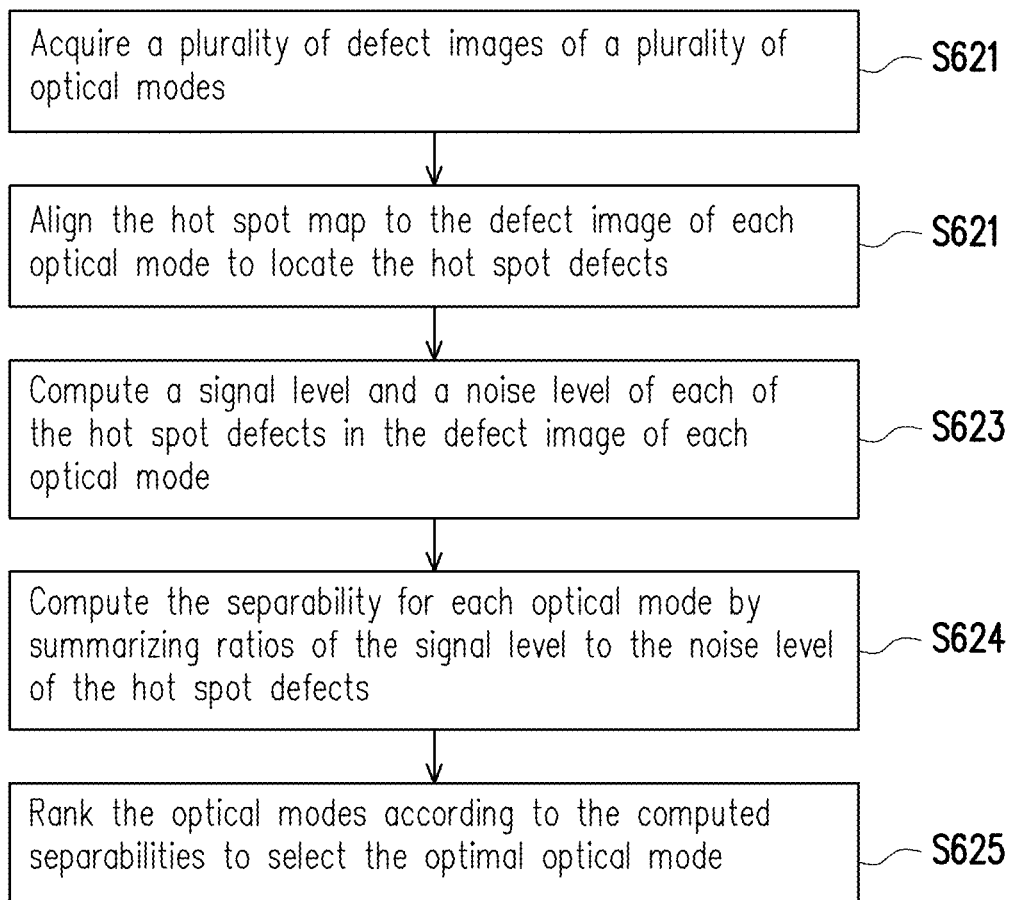
FIG. 7 is a flowchart illustrating a method for selecting an optimal optical mode according to an embodiment of the disclosure.

FIG. 7 is a flowchart illustrating a method for selecting an optimal optical mode according to an embodiment of the disclosure. Referring to FIG. 7, the method of the present embodiment illustrates the detailed steps of the step S62 in FIG. 6.

In step S621, the processor 130 acquires a plurality of defect images of a plurality of optical modes from the inspection tool. The defect images acquired by the processor 130 from the inspection tool may include defects and/or nuisances.

In step S622, the processor 130 aligns the hot spot map to the defect image of each optical mode to locate the hot spot defects.

In step S623, the processor 130 computes a signal level and a noise level of each of the hot spot defects in the defect image of each optical mode.

In step S624, the processor 130 computes the separability of defects to nuisances for each optical mode by summarizing ratios of the signal level to the noise level of the hot spot defects.

In step S625, the processor 130 ranks the optical modes according to the computed separabilities so as to select the optimal optical mode.

Back to the flow in FIG. 6, in step S64, the processor 130 trains a machine learning model for classifying the defects from the nuisances with the defect images of the selected optimal optical mode so as to evaluate optimal filters for detecting the hot spot defects for the optimal optical mode.

In some embodiments, a convolution neural network (CNN) model is created and trained with defect images and nuisance images so as to find optimal filters for classifying the defects and the nuisances.

Figure 8:
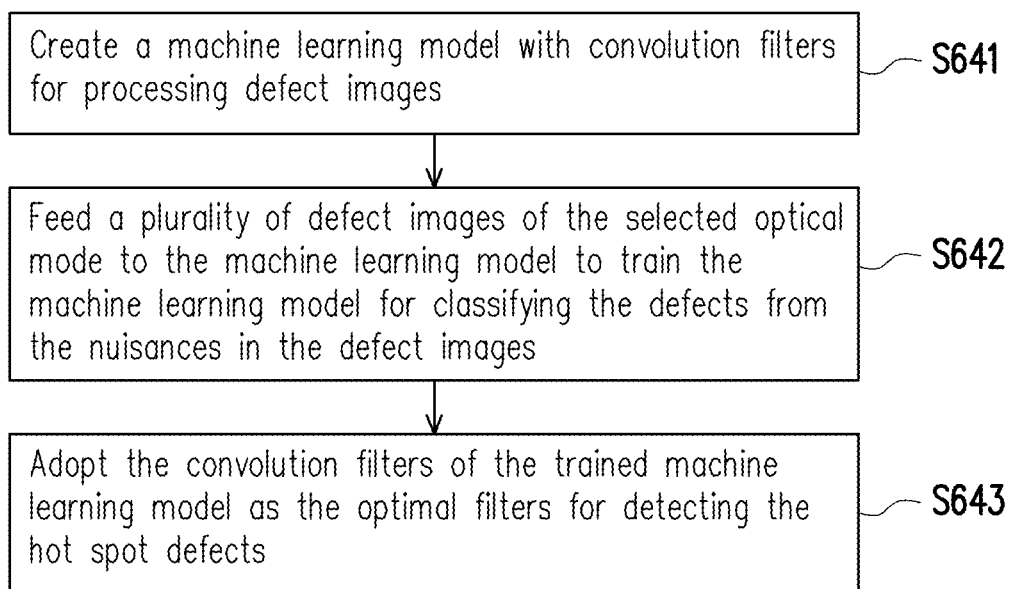
FIG. 8 is a flowchart illustrating a method for generating optimal image filters according to an embodiment of the disclosure.

FIG. 8 is a flowchart illustrating a method for generating optimal image filters according to an embodiment of the disclosure. Referring to FIG. 8, the method of the present embodiment illustrates the detailed steps of the step S64 in FIG. 6.

In step S641, the processor 130 creates a machine learning model with convolution filters for processing the defect images.

In step S642, the processor 130 feeds a plurality of defect images including defects and/or nuisances of the selected optical mode to the machine learning model to train the machine learning model for classifying the defects from the nuisances in the defect images.

In step S643, the processor 130 adopts the convolution filters of the trained machine learning model as optimal filters for detecting the hot spot defects.

Figure 9:
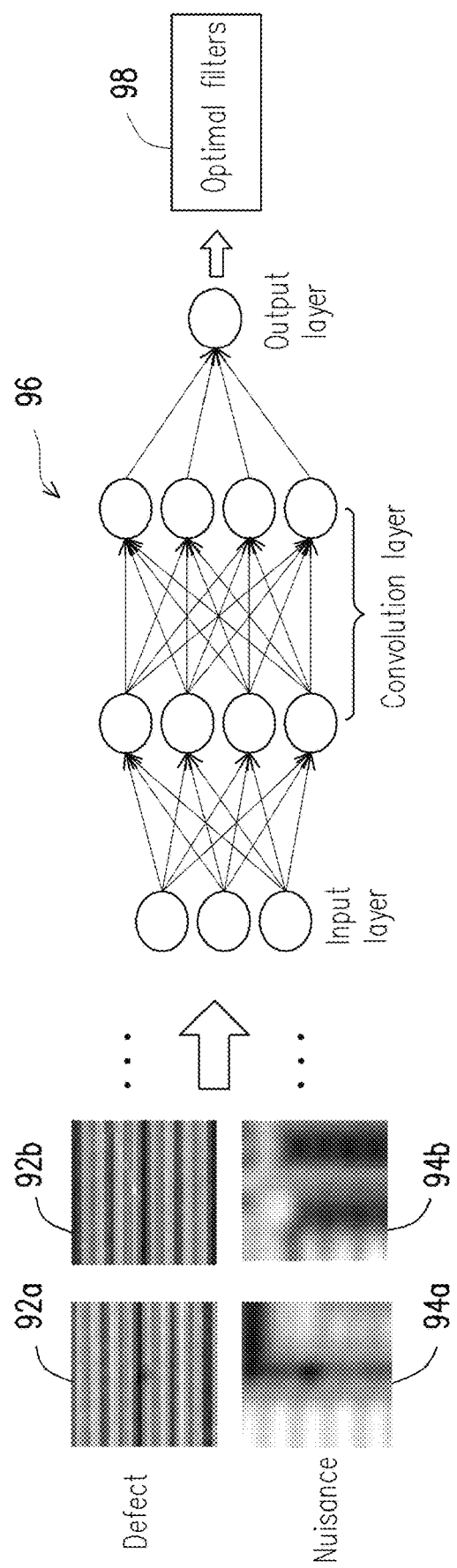
FIG. 9 is an example of generating optimal image filters according to an embodiment of the disclosure.

For example, FIG. 9 is an example of generating optimal image filters according to an embodiment of the disclosure. Referring to FIG. 9, a plurality of defect images (including images 92a and 92b) and a plurality of nuisance images (including images 94a and 94b) are fed into a convolution neural network 96 which includes multiple input layers, multiple convolution layers (two convolution layers are taken as an example in the present embodiment), and an output layer to train the convolution neural network 96 to classify defects from nuisances. The convolution filters created from the convolution layers of the trained convolution neural network 96 are adopted as the optimal filters 98 for detecting the hot spot defects.

As a result, the image filters optimized to separate hot spot defects from nuisances are generated, and the generated image filters are applied to the pixel values of the hot spots of each hot spot group in the corresponding threshold region so as to filter out nuisance images from the defect images.

Back to the flow in FIG. 6, in step S66, the processor 130 acquires a plurality of defect images obtained by the inspection tool performing hot scans on the wafer under the optimal optical mode in runtime and aligns a hot spot map comprising a plurality of groups of hot spots extracted from the design to each of the defect images to locate the hot spot groups in each defect image.

In step S68, the processor 130 detects the hot spot defects in each defect image by dynamically mapping the hot spot groups located in each defect image to a plurality of threshold regions, applying the optimal filters to the pixel values of the hot spots of each hot spot group in the corresponding threshold region, and respectively performing automatic thresholding on pixel values of the hot spots of each hot spot group in the corresponding threshold region.

Through applying the optimal filters to the pixel values of the hot spots before performing the automatic thresholding, the nuisances can be found and filtered from the defect images such that an accuracy for detecting the hot spot defects can be enhanced.

Through the method, the present disclosure provides one or more of the following advantages: (1) defining most effective hot spots; (2) learning optimal optical mode and filtering parameters; (3) efficiently processing the hot spot scan data on inspection tools; and (4) enabling inspection tools to gain sensitivity on smallest defects of interest (DOIs) beyond current capability.

According to some embodiments, a hot spot defect detecting method adapted to an electronic apparatus is provided. In the method, a plurality of hot spots are extracted from a design of a semiconductor product to define a hot spot map comprising a plurality of hot spot groups, wherein a plurality of local patterns in a same context of the design yielding a same image content are defined as a same hot spot group. A plurality of defect images obtained by an inspection tool performing hot scans on a wafer manufactured with the design are acquired during runtime and the hot spot map is aligned to each of the defect images to locate the hot spot groups in each defect image. The hot spot defects in each defect image are detected by dynamically mapping the hot spot groups located in each defect image to a plurality of threshold regions and respectively performing automatic thresholding on pixel values of the hot spots of each hot spot group in the corresponding threshold region.

According to some embodiments, a system for detecting hot spot defects includes a connecting device configured to connect an inspection tool, a storage medium configured to store the images acquired by the connecting device, and a processor coupled to the connecting device and the storage medium. The processor is configured to execute instructions to perform steps of extracting a plurality of hot spots from a design of a semiconductor product to define a hot spot map comprising a plurality of hot spot groups, wherein a plurality of local patterns in a same context of the design yielding a same image content are defined as a same hot spot group; acquiring a plurality of defect images obtained by an inspection tool performing hot scans on a wafer manufactured with the design during runtime and aligning the hot spot map to each of the defect images to locate the hot spot groups in each defect image; and detecting the hot spot defects in each defect image by dynamically mapping the hot spot groups located in each defect image to a plurality of threshold regions and respectively performing automatic thresholding on pixel values of the hot spots of each hot spot group in the corresponding threshold region.

According to some embodiments, a hot spot defect detecting method adapted to an electronic apparatus is provided. In the method, a plurality of defect images of a plurality of optical modes obtained by an inspection tool performing hot scans on a wafer manufactured with a design of a semiconductor product under the optical modes are acquired and an optimal optical mode for detecting the hot spot defects is selected from among the optical modes based on a separability of defects to nuisances in the defect images for each optical mode. A machine learning model for classifying the defects from the nuisances is trained with the defect images of the selected optimal optical mode to evaluate optimal filters for detecting the hot spot defects for the optimal optical mode. A plurality of defect images obtained by the inspection tool performing hot scans on the wafer under the optimal optical mode are acquired in runtime and a hot spot map comprising a plurality of groups of hot spots extracted from the design is aligned to each of the defect images to locate the hot spot groups in each defect image. The hot spot defects in each defect image are detected by dynamically mapping the hot spot groups located in each defect image to a plurality of threshold regions, applying the optimal filters to the pixel values of the hot spots of each hot spot group in the corresponding threshold region, and respectively performing automatic thresholding on pixel values of the hot spots of each hot spot group in the corresponding threshold region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for detecting hot spot defects, adapted to an electronic apparatus, the method comprising:
   acquiring a plurality of defect images obtained by an inspection tool performing hot scans on a wafer manufactured with the design during runtime and aligning a hot spot map comprising a plurality of hot spot groups extracted from a design of the wafer to each of the defect images to locate the hot spot groups in each defect image;
   for each of the defect images, dynamically mapping each of the hot spot groups located in the respective defect image to one of a plurality of threshold regions; and
   for each of the threshold regions, calculating a difference image of a hot spot image of the host spot group and a corresponding hot spot image in a reference image of the defect image, calculating a histogram of pixel values of the different image to evaluate at least a detection threshold for differentiating data points in the histogram, and determining the pixels having the pixel values deviating from the detection threshold as the hot spot defect.

2. The method according to claim 1, further comprising:
   acquiring a plurality of defect images obtained by the inspection tool performing hot scans, under a plurality of optical modes, on the wafer manufactured with the design; and
   selecting an optimal optical mode for detecting the hot spot defects from among the plurality of optical modes based on a separability of defects to nuisances in the defect images obtained under each optical mode, wherein
   the defect images obtained by the inspection tool performing hot scans on the wafer manufactured with the design under the selected optimal optical mode are acquired for detecting the hot spot defects.

3. The method according to claim 2, wherein the step of selecting the optimal optical mode comprises:
   aligning the hot spot map to the defect image of each optical mode to locate the hot spot defects;
   computing a signal level and a noise level of each of the hot spot defects in the defect image of each optical mode;
   computing the separability for each optical mode by summarizing ratios of the signal level to the noise level of the hot spot defects; and
   ranking the optical modes according to the computed separabilities to select the optimal optical mode.

4. The method according to claim 2, further comprising:
   training a machine learning model for classifying the defects from the nuisances with the defect images of the selected optical mode to evaluate optimal filters for detecting the hot spot defects.

5. The method according to claim 4, wherein the step of training the machine learning model for classifying the defects from the nuisances with the defect images of the selected optical mode to evaluate the optimal filters for detecting the hot spot defects comprises:
   creating the machine learning model with convolution filters for processing the defect images;
   feeding a plurality of defect images of the selected optical mode to the machine learning model to train the machine learning model for classifying the defects from the nuisances in the defect images; and
   adopting the convolution filters of the trained machine learning model as the optimal filters for detecting the hot spot defects, wherein
   the optimal filters are applied to the pixel values of the hot spots of each hot spot group in the corresponding threshold region before performing the automatic thresholding.

6. The method according to claim 1, wherein a plurality of local patterns extracted from a design of a semiconductor product are defined as a plurality of hot spots and a plurality of local patterns in a same context of the design yielding a same image content are defined as the hot spots of a same hot spot group.

7. The method according to claim 1, wherein defects detected in each of the threshold region are mapped to the corresponding hot spot groups as the hot spot defects in the defect image.

8. A system for detecting hot spot defects, comprising:
a connecting device, configured to connect an inspection tool;
a storage medium, configured to store images acquired by the connecting device;
a processor, coupled to the connecting device and the storage medium, and configured to execute instructions to perform steps of:
acquiring a plurality of defect images obtained by an inspection tool performing hot scans on a wafer manufactured with the design during runtime and aligning a hot spot map comprising a plurality of hot spot groups extracted from a design of the wafer to each of the defect images to locate the hot spot groups in each defect image;
for each of the defect images, dynamically mapping each of the hot spot groups located in the respective defect image to one of a plurality of threshold regions; and
for each of the threshold regions, calculating a difference image of a hot spot image of the host spot group and a corresponding hot spot image in a reference image of the defect image, calculating a histogram of pixel values of the different image to evaluate at least a detection threshold for differentiating data points in the histogram, and determining the pixels having the pixel values deviating from the detection threshold as the hot spot defect.

9. The system according to claim 8, wherein the processor is further configured to execute instructions to perform steps of:
acquiring a plurality of defect images obtained by the inspection tool performing hot scans, under a plurality of optical modes, on the wafer manufactured with the design; and
selecting an optimal optical mode for detecting the hot spot defects from among the plurality of optical modes based on a separability of defects to nuisances in the defect images obtained under each optical mode, wherein
the defect images obtained by the inspection tool performing hot scans on the wafer manufactured with the design under the selected optimal optical mode are acquired for detecting the hot spot defects.

10. The system according to claim 9, wherein the processor is further configured to execute instructions to perform steps of:
aligning the hot spot map to the defect image of each optical mode to locate the hot spot defects;
computing a signal level and a noise level of each of the hot spot defects in the defect image of each optical mode;
computing the separability for each optical mode by summing ratios of the signal level to the noise level of the hot spot defects; and
ranking the optical modes according to the computed separabilities to select the optimal optical mode.

11. The system according to claim 9, wherein the processor is further configured to execute instructions to perform a step of:
training a machine learning model for classifying the defects from the nuisances with the defect images of the selected optical mode to evaluate optimal filters for detecting the hot spot defects.

12. The system according to claim 11, wherein the processor is further configured to execute instructions to perform steps of:
creating the machine learning model with convolution filters for processing the defect images;
feeding a plurality of defect images of the selected optical mode to the machine learning mode to train the machine learning model for classifying the defects from the nuisances in the defect images; and
adopting the convolution filters of the trained machine learning model as optimal filters for detecting the hot spot defects, wherein
the optimal filters are applied to the pixel values of the hot spots of each hot spot group in the corresponding threshold region before performing the automatic thresholding.

13. The system according to claim 8, wherein a plurality of local patterns extracted from a design of a semiconductor product are defined as a plurality of hot spots and a plurality of local patterns in a same context of the design yielding a same image content are defined as the hot spots of a same hot spot group.

14. The system according to claim 8, wherein the processor maps defects detected in each of the threshold region to the corresponding hot spot groups as the hot spot defects in the defect image.

15. A method for detecting hot spot defects, adapted to an electronic apparatus, the method comprising:
acquiring a plurality of defect images obtained by an inspection tool performing hot scans on a wafer manufactured with a design, and training a machine learning model for classifying the defects from the nuisances with the defect images to evaluate optimal filters for detecting the hot spot defects; and
acquiring a plurality of defect images obtained by the inspection tool performing hot scans on the wafer in runtime and aligning a hot spot map comprising a plurality of hot spot groups extracted from the design to each of the defect images to locate the hot spot groups in each defect image;
for each of the defect images, dynamically mapping each of the hot spot groups located in the respective defect image to one of a plurality of threshold regions; and
for each of the threshold regions, applying the optimal filters to the pixel values of the hot spots of each hot spot group, calculating a difference image of a hot spot image of the host spot group and a corresponding hot spot image in a reference image of the defect image, calculating a histogram of pixel values of the different image to evaluate at least a detection threshold for differentiating data points in the histogram, and determining the pixels having the pixel values deviating from the detection threshold as the hot spot defect.

16. The method according to claim 15, wherein the step of acquiring the plurality of defect images and training the machine learning model comprises:
acquiring a plurality of defect images obtained by the inspection tool performing hot scans, under a plurality of optical modes, on a wafer manufactured with a design of a semiconductor product and selecting an optimal optical mode for detecting the hot spot defects from among the plurality of optical modes based on a separability of defects to nuisances in the defect images obtained under each optical mode; and
training the machine learning model for classifying the defects from the nuisances with the defect images obtained under the selected optimal optical mode to evaluate optimal filters for detecting the hot spot defects for the optimal optical mode.

17. The method according to claim 16, wherein the step of selecting the optimal optical mode comprises:
  aligning the hot spot map to the defect image of each optical mode to locate the hot spot defects;
  computing a signal level and a noise level of each of the hot spot defects in the defect image of each optical mode;
  computing the separability for each optical mode by summing ratios of the signal level to the noise level of the hot spot defects; and
  ranking the optical modes according to the computed separabilities to select the optimal optical mode.

18. The method according to claim 16, wherein the step of training the machine learning model for classifying the defects from the nuisances with the defect images obtained under the selected optical mode to evaluate the optimal filters for detecting the hot spot defects for the optimal optical mode comprises:
  creating the machine learning model with convolution filters for processing the defect images;
  feeding a plurality of defect images of the selected optical mode to the machine learning mode to train the machine learning model for classifying the defects from the nuisances in the defect images; and
  adopting the convolution filters of the trained machine learning model as optimal filters for detecting the hot spot defects, wherein
  the optimal filters are applied to the pixel values of the hot spots of each hot spot group in the corresponding threshold region before performing the automatic thresholding.

19. The method according to claim 15, wherein defects detected in each of the threshold region are mapped to the corresponding hot spot groups as the hot spot defects in the defect image.

20. The method according to claim 15, wherein the machine learning model comprises a convolution neural network (CNN) model.

* * * * *